United States Patent [19]

Breuer et al.

[11] Patent Number: 4,504,394

[45] Date of Patent: Mar. 12, 1985

[54] PROCESS FOR THE TREATMENT OF ORGANIC FALL-OUT PRODUCTS

[75] Inventors: Hans Breuer, Biel; Frank Rindelaub, Areuse, both of Switzerland; Gerhard Velebil, Schliengen, Fed. Rep. of Germany

[73] Assignee: BRV Technologie-Systeme AG, Areuse, Switzerland

[21] Appl. No.: 525,949

[22] Filed: Aug. 24, 1983

[30] Foreign Application Priority Data

Sep. 3, 1982 [EP] European Pat. Off. ........ 82810367.1

[51] Int. Cl.³ ............................................. C02F 1/38
[52] U.S. Cl. ..................................... 210/632; 210/912
[58] Field of Search ............... 210/606, 609, 631, 632, 210/905, 912, 638, 639, 650, 651, 663, 739, 766, 768, 781

[56] References Cited

U.S. PATENT DOCUMENTS

| 4,159,944 | 7/1979 | Erickson et al. | 210/606 |
| 4,267,049 | 5/1981 | Erickson et al. | 210/606 |
| 4,342,650 | 8/1982 | Erickson et al. | 210/606 |

FOREIGN PATENT DOCUMENTS 2042571 4/1971 Fed. Rep. of Germany .

Primary Examiner—Thomas Wyse
Attorney, Agent, or Firm—Wender Murase & White

[57] ABSTRACT

A process for the treatment of organic fall-out products with separation of noxious matter, in particular heavy metals, wherein the organic fall-out products are submitted to an aerobic pretreatment, subsequently to a treatment for disintegrating the cells and wherein the valuable and noxious substances contained in said cells, laid bare by said disintegrating treatment, are separated and the noxious matter eliminated, and the thus obtained solution, free from noxious matter, is submitted to a treatment for recovering the valuable substances contained therein, in particular proteins to be used as forage or fertilizers or the like.

This is an economic process for obtaining superior substances, in particular proteins, which are free from noxious matter such as heavy metals, from organic fall-out products such as sewage water or sludge.

8 Claims, 1 Drawing Figure

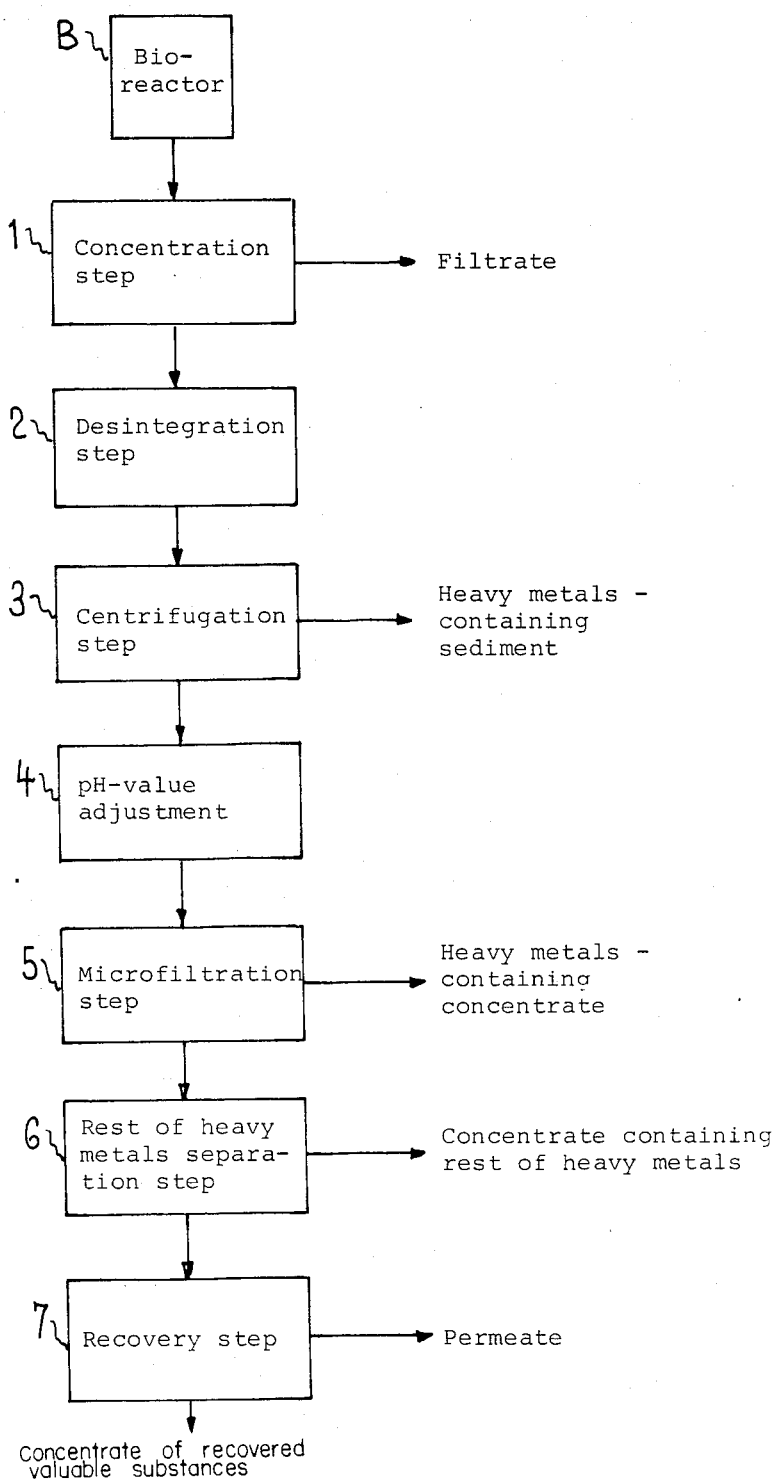

PROCESS FOR THE TREATMENT OF ORGANIC FALL-OUT PRODUCTS

BACKGROUND OF THE INVENTION

The present invention relates to a process for the treatment of organic fall-out products with separation of noxious matter, whereby it is primarily thought at the recovering of proteins and whereby in particular heavy metals are to be eliminated.

Organic fall-out products, in particular sewage water, sludge, liquid dung or whey and slop or schlempe are problematic for being utilized as forage, fertilizer etc., in particular because of the undesired heavy metals contained therein.

With known processes for the recovering of proteins from organic fall-out products, a superior utilization is limited due to the heavy metals contained in said products.

It is an object of this invention to disclose a process according to which it is possible to recover economically highly utilizable substances, in particular proteins, from organic fall-out products, without containing noxious matter like heavy metals.

BRIEF SUMMARY OF THE INVENTION

This object is attained in that the aerobically pretreated organic fall-out products are submitted to a treatment for disintegrating the cells and that afterwards the laid bare valuable and noxious substances are separated and the solution which is freed from noxious matter is submitted to a treatment for the recovery of the valuable substances.

BRIEF DESCRIPTION OF THE DRAWING

The invention will be further described by way of examples with reference to the unique accompanying drawing, representing schematically a process of the invention.

DESCRIPTION OF THE PREFERRED EMBODIMENTS

The main idea of the process of the invention is to lay bare and to render accessible the valuable and the noxious substances contained in the cells of the microorganism, for eliminating the noxious substances, in particular heavy metals such as Cd, Cu, Hg or Pb and to recover the freed valuable substances, in particular proteins, for superior utilization.

Referring to the drawing, the preconcentrated biomass, preferably from a circulation bio-reactor B, as disclosed in the European Patent Application No. 82810366.3 of the same inventors, attains concentration step 1, where water is abstracted. This water can for example be fed into the sewage treatment plant for re-utilization. This concentration can be effectuated by static abstraction or mechanically with or without coagulation agents or with the aid of centrifuges, separators or the like known means.

The concentrated biomass attains disintegration step 2, in which the cells of the micro-organism are disintegrated for laying bare its content. This disintegrating can be effestuated by physico-chemical and thermic treatment, or by mechanical treatment, for example grinding or pressure relieving, or by freezing, followed by shock treatment or by enzymatic treatment. It is also possible to employ a combination of several of the mentioned treatments.

The disintegrated and laid bare biomass is led to a centrifugation step 3, in which the solid matter and a preponderant part of the heavy metals are separated. This solid matter can be re-utilized, for example for energy recovery in a digestion tower.

In step 4, the solution from the centrifuge is adjusted to the correct pH-value for heavy metals separation, advantageously 6.5–9.0, for example with sulfuric acid.

The thus correctly adjusted solution attains step 5, in which the solution is submitted to a microfiltration, employing suitable microfilter columns. By this microfiltration a further part of heavy metals is separated, as well as fine dispersed and colloidal solid matter. Advantageously filters with a pore width of 0.2 to 1.0 $\mu$m are utilized.

Subsequently the filtrated solution attains the heavy metal separation step 6, in which the rest of the heavy metals is separated by suitable ion exchanger or by precipitation with following sedimentation. The thus obtained solution consists essentially of amino acids, non-noxious mineral salts and soluble organic matter.

In following step 7, a concentration according to the desired utilization is effectuated, by known physical or physico-chemical processes, advantageously by ultrafiltration. In this step, it is possible to recover in particular proteins for the utilization as forage, fertilizers and the like.

We claim:

1. A process for treating a heavy metal contaminated preconcentrated biomass for separating heavy metal contaminants therefrom, which comprises:

removing water from preconcentrated biomass material to form a concentrate;

disintegrating the concentrate to disrupt the cell structure of the organic material contained therein, thereby laying bare both valuable and recoverable organic substances contained within the cell structure and heavy metal contaminants;

centrifuging the disintegrated concentrate to recover a sediment portion and a liquid portion, said sediment portion containing a preponderant part of the heavy metal contaminants contained originally in the disintegrated concentrate;

adjusting the PH of the liquid portion recovered in the centrifugation step to a level suitable for additional heavy metal contaminant separation;

microfiltering the PH-adjusted liquid portion to separate therefrom an additional portion of the heavy metal contaminants;

treating the liquid effluent from the microfiltration step to facilitate a still further separation of heavy metal contaminants; and separating the treated liquid effluent into a concentrate containing substantially all of the remaining heavy metal contaminants and an aqueous solution consisting essentially of amino acids, non-noxious mineral salts and soluble organic matter.

2. A process according to claim 9, wherein the disintegration of the cells is effectuated by a physical, physicochemical or thermic process or by a combination of said processes.

3. A process according to claim 1, wherein the disintegration of the cells is effectuated by an enzymatic process.

4. A process according to claim 1, wherein the liquid portion recovered in the centrifugation step is adjusted to a PH-value of 6.5 to 9.0.

5. A process according to claim 1, wherein the microfiltration step is effecuated after the disintegration of the cell structure of the biomass material, utilizing a pore width of 0.2 to 1.0 micron.

6. A process according to claim 5, wherein the microfiltration is followed by a separation of the noxious matter by ion exchanger means.

7. The process of claim 1, further comprising the step of:
   aerobically pretreating the biomass material prior to the concentration and disintegration steps.

8. The process of claim 1 further comprising the step of ultrafiltering the aqueous solution consisting essentially of amino acids, non-noxious mineral salts and soluble organic matter to recover a protein-rich fraction therefrom.

* * * * *